(12) United States Patent
Vila Corts

(10) Patent No.: US 6,852,218 B2
(45) Date of Patent: Feb. 8, 2005

(54) SWIMMING POOL WATER TREATMENT PLANT

(75) Inventor: Francesc Xavier Vila Corts, Polinya (ES)

(73) Assignee: Astral Pool Espana, S.A.U., Polinya (ES)

( * ) Notice: Subject to any disclaimer, the term of this patent is extended or adjusted under 35 U.S.C. 154(b) by 0 days.

(21) Appl. No.: 10/413,126

(22) Filed: Apr. 14, 2003

(65) Prior Publication Data

US 2003/0200603 A1 Oct. 30, 2003

(30) Foreign Application Priority Data

Oct. 15, 2002 (ES) .......................................... 200202459
Jan. 7, 2003 (ES) .......................................... 200201161

(51) Int. Cl.[7] .............................. E04H 4/16; C02F 1/50; C02F 1/78
(52) U.S. Cl. ........................ 210/169; 210/206; 210/259; 210/263; 210/416.2
(58) Field of Search ............................. 210/169, 198.1, 210/205, 206, 252, 259, 263, 416.1, 416.2

(56) References Cited

U.S. PATENT DOCUMENTS

| | | | | |
|---|---|---|---|---|
| 2,057,208 A | * | 10/1936 | Runcie | 210/128 |
| 3,749,244 A | * | 7/1973 | Jannuzzi, Jr. | 210/169 |
| 4,381,240 A | * | 4/1983 | Russell | 210/746 |
| 5,232,582 A | * | 8/1993 | Takahashi et al. | 210/86 |
| 5,427,748 A | * | 6/1995 | Wiedrich et al. | 422/284 |
| 5,882,512 A | * | 3/1999 | Denkewicz et al. | 210/169 |
| 5,980,761 A | * | 11/1999 | Boissie et al. | 210/807 |
| 6,274,052 B1 | * | 8/2001 | Hartwig | 210/760 |

FOREIGN PATENT DOCUMENTS

| | | | |
|---|---|---|---|
| DE | 2206735 | * | 10/1972 |
| DE | 2420179 | * | 4/1974 |
| DE | 2450731 | * | 4/1976 |

* cited by examiner

Primary Examiner—Fred G. Prince
(74) Attorney, Agent, or Firm—Steinberg & Raskin, P.C.

(57) ABSTRACT

A plant comprising a water filtering device with a motor pump, the device for chemically treating the water, the pipes with the corresponding valves and with the openings for receiving the water from the swimming pool and for returning the cleaned and treated water to the swimming pool, and the corresponding accessories are all connected and installed on a base framework allowing to transport the whole ready-to-operate plant to a chosen site. All of the components making up this plant can be distributed in independent modules being apt to be fitted to each other. The assembly being made up of all of the components and accessories of the plant, both if they are installed on a single base framework as well as if they are distributed in modules, is of such dimensions as to be apt to be put in a conventional container facilitating its transportation.

10 Claims, 5 Drawing Sheets

SWIMMING POOL WATER TREATMENT PLANT

BACKGROUND OF THE INVENTION

As is well known, swimming pool water must be periodically cleaned of impurities and small debris by passing it through a filter, the water also needing to be disinfected and for such a purpose being submitted to a chemical treatment being generally carried out with chlorine.

This requires a facility being erected "in situ" and comprising the filter and the corresponding motor pump, the reservoir with proportioner for the disinfectant, this latter generally being chlorine, and the corresponding pipes and valves and other accessories, the erection of the facility requiring much space and being labor intensive for an operative facility of this kind.

SUMMARY OF THE INVENTION

This invention has as its objective a swimming pool water cleaning and treating plant comprising all of the necessary apparatuses and devices duly provided with their accessories for carrying out the functions, all the components being as a whole installed and secured onto a base framework supporting them, all of the components being conveniently connected and arranged so as to be employable anywhere and at any time, the plant for such purpose only occupying a very small space and being therefore apt to be put in a conventional container and to thus and through the use of any transportation means be easily transported to its place of destination where upon its arrival it is already in a position to be connected to the swimming pool and to the mains for immediate operation.

On top of these advantages the plant incorporates as well notable improvements both as regards the filtering devices and the means being used for chemically treating the water.

The filtering devices comprise a silica filter from which the water passes to a diatomaceous earth filter and thus comes out much clearer and having an enhanced quality.

The means being used for chemically treating the water do on the other hand comprise the use of ozone as a viricide deploying its action when confronted with bacteria and fungi and giving the water a nice blue color, and of bromine as an oxidant not producing odors or inert, nitrogenized derivatives, although another halogen could also be used as a disinfectant.

This plant will also comprise the corresponding drive and control panel as well as a buffer vessel being provided to receive the swimming pool water, and an acid proportioner.

The container or the framework supporting the plant cannot in some cases gain access to the site where the plant has to be installed, this being due to the narrow dimensions of the passage leading to the site.

In order to solve this problem the framework has been divided into several modules each comprising a part of the plant's devices and of their accessories, the modules being hence in a position to pass through those places previously not allowing the passage of the whole plant.

This division of the plant into modules does as well allow to facilitate its storage, and in some cases also facilitates its transportation to the site.

These independent modules are apt to be fitted to each other, the connections between them being apt to be carried out at the site where the plant is to be installed, the components being installed in each module for such a purpose comprising their particularized connections in correspondence with the connections of the components of the module to which the each module has to be fitted, a possibly wrong connection between the different components of the plant being thus precluded.

Once having been fitted to each other the modules do advantageously occupy a rectangular space corresponding to the dimensions of the base of a conventional container.

In a preferential instance the plant will be installed in five modules each of them for example basically comprising: a silica filter and the chemical proportioner; the drive and control panel, and the acid proportioner with the chemical reservoir; a diatomaceous earth filter with its charger-store; the contact chamber and the ozone destructor; and the buffer tank.

These and other characteristics will be best made apparent by the following detailed description whose understanding will be made easier by the accompanying five sheets of drawings showing practical embodiments being cited only by way of example not limiting the scope of the present invention.

DETAILED DESCRIPTION

Figure 1:
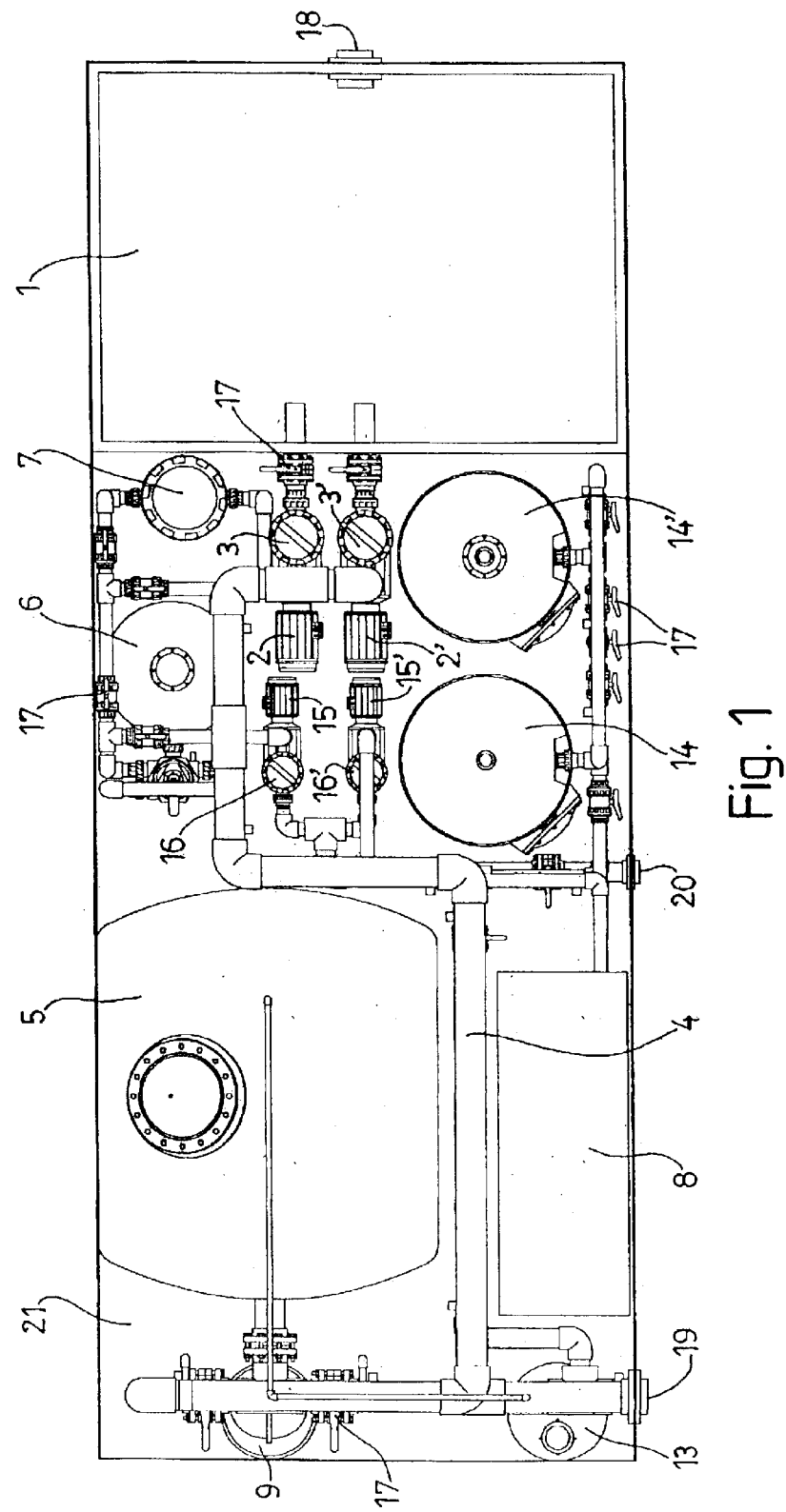
FIGS. 1, 2 and 3 in a plan-view, in a front elevation and in a side elevation (at a larger scale) respectively represent the plant being the object of the invention.
Figure 2:
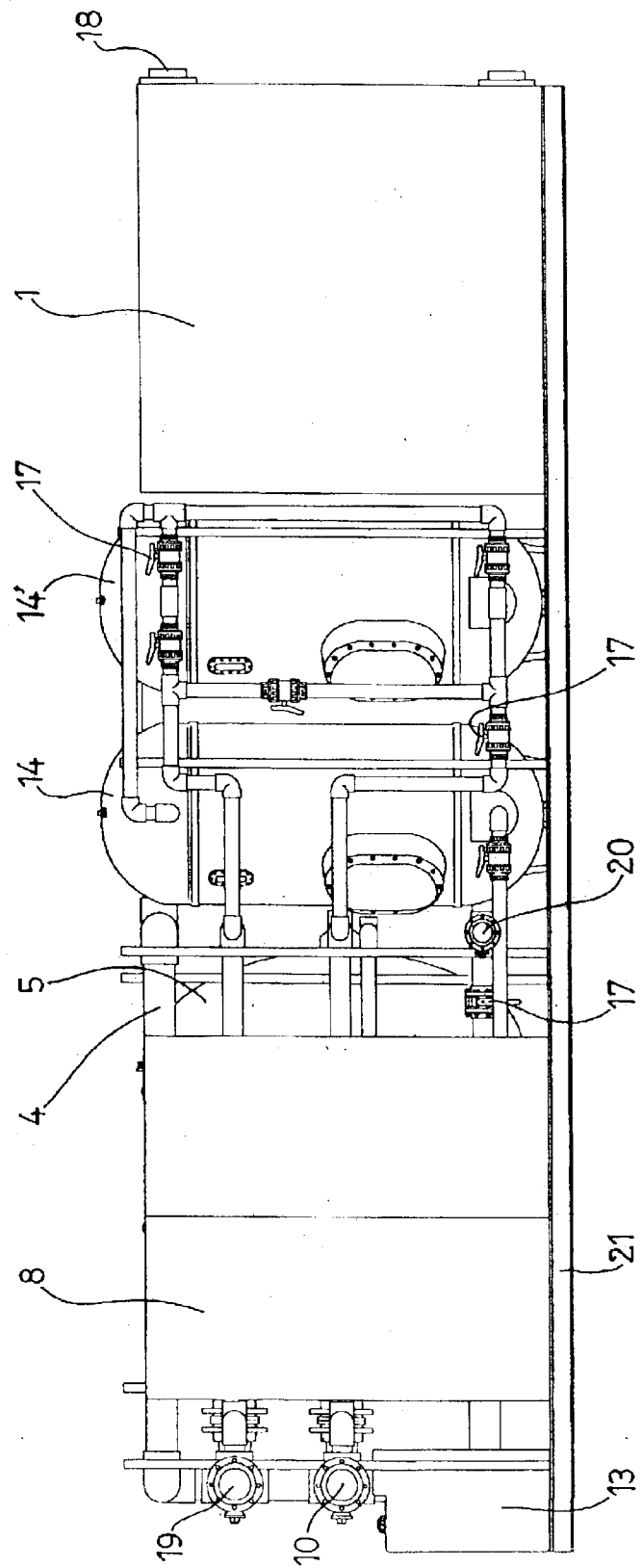
Figure 3:
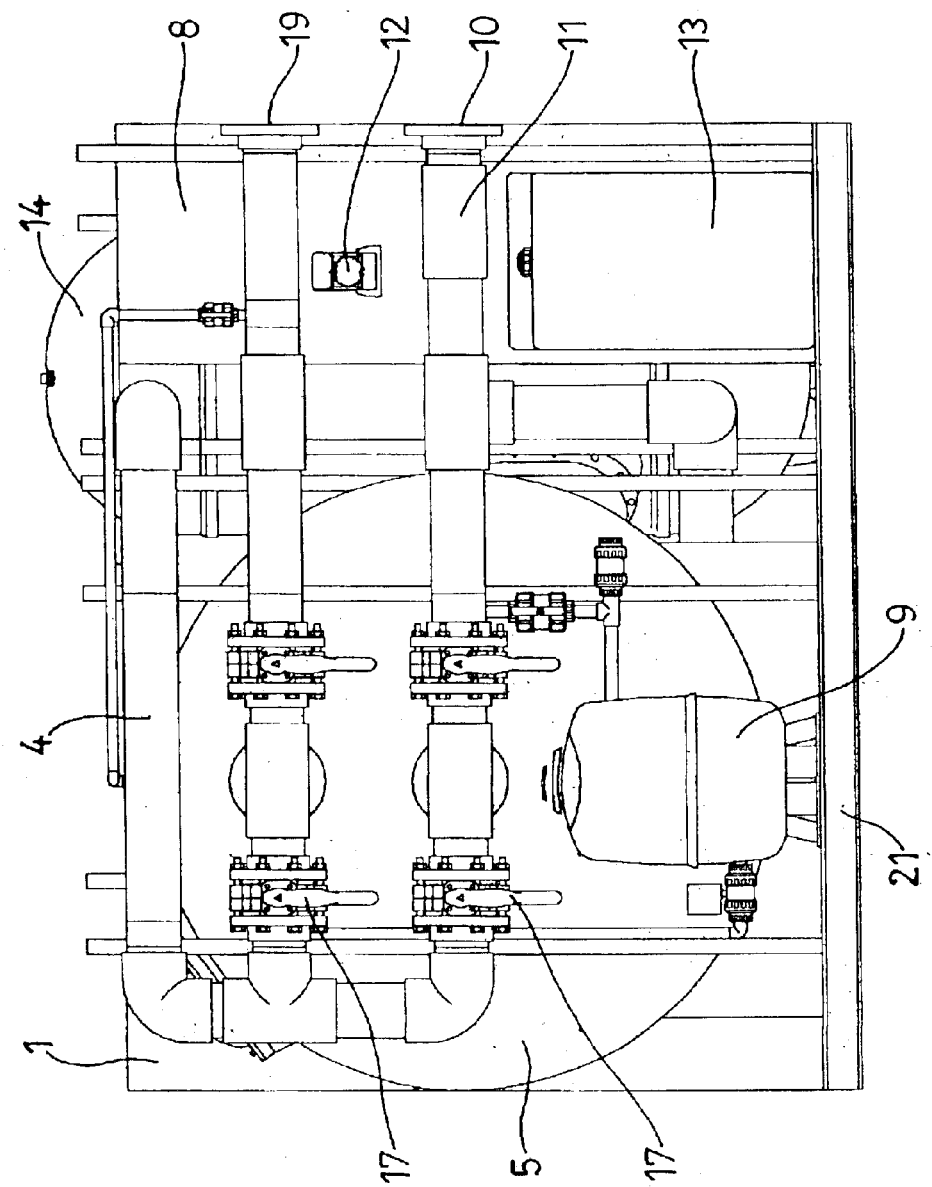

The plant comprises a buffer vessel or tank 1 being provided to receive the water from the swimming pool; the water being conveyed by means of the motor pump 2 and through the prefilter 3 and the pipe 4 towards the horizontally arranged silica filter 5. The water filtration is complemented with the ulterior passage of the water through a diatomaceous earth filter 6 being connected to a diatomaceous earth charger-store 7.

The water is chemically treated with ozone being generated in the drive and control panel 8, and with bromine or another disinfectant from the proportioner 9, and is thereupon returned to the swimming pool through the opening 10 of pipe 11.

The plant is completed with the acid proportioner 12 and the chemical reservoir 13.

The plant does furthermore comprise the contact chamber 14, the ozone destructor 14', the motor pump 15 with prefilter 16 for pumping the water to the diatomaceous earth filter 6, and the corresponding manual or automated valves 17 for governing the water circulation.

On top of the motor pump 2 with its prefilter 3, and of the motor pump 15 with its prefilter 16 other motor pumps 2' and 15' with their prefilters 3' and 16' have been foreseen for optional operation.

Numeral 18 indicates the overflow of the buffer vessel 1; numeral 19 indicates the drain outlet; and numeral 20 indicates an accessory inlet being provided for the suction of swimming pool water whenever necessary.

This whole plant is arranged and secured onto a base framework 21, the assembly being made up of the apparatuses and devices with their accessories determining a volume as per a prism having a rectangular base of adequate dimensions (650×250×210 cm) allowing to put it in a conventional container for its transportation through any means.

Figure 4:
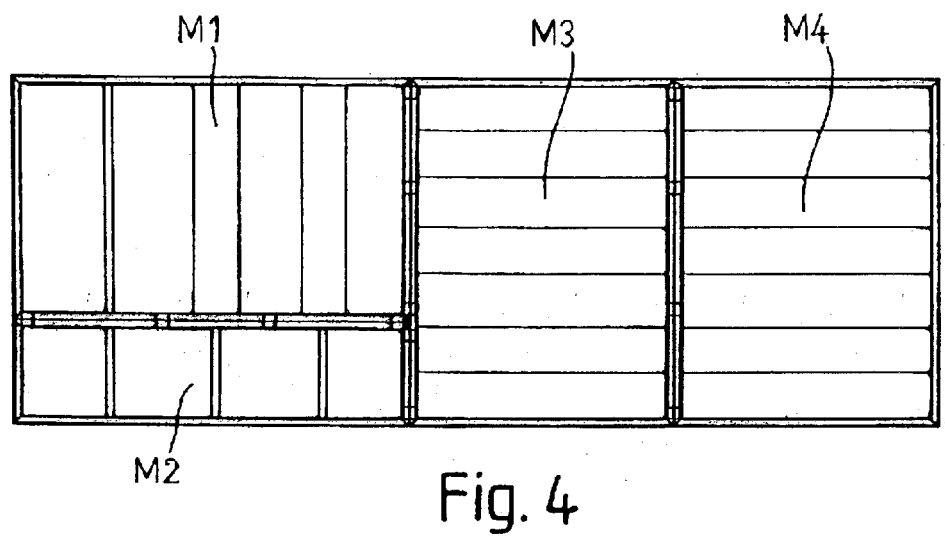
FIGS. 4 and 5 respectively represent a modular diagram and an installation diagram corresponding to a basic plant.

According to FIG. 4 the basic plant for the treatment of swimming pool water comprises the following modules with the corresponding plant components: module M1 corresponding to the silica filter area; module M2 corresponding to the drive and control panel, acid proportioner unit and motor pump area; modules M3 and M4 corresponding to the buffer tanks being possibly provided in varying numbers as required by the swimming pool in question.

Figure 5:
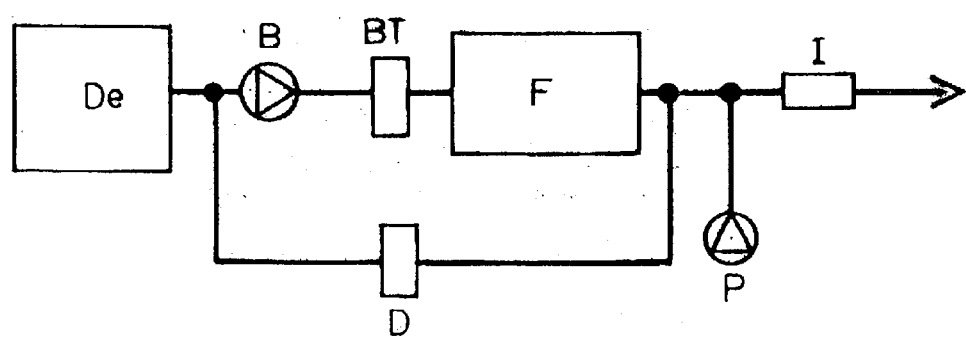

According to FIG. 5 this basic plant comprises in the installation: buffer tanks De, recirculating pump B, five-valve manual battery BT, silica filter F, Cl/Br proportioner D, pH proportioner P, and water/water exchanger I.

This basic plant can be automated by arranging the filter battery in a motorized arrangement allowing to automatically carry out all functions such as the filtering, washing, rinsing, emptying and other functions intervening in the swimming pool water treatment.

Figure 6:
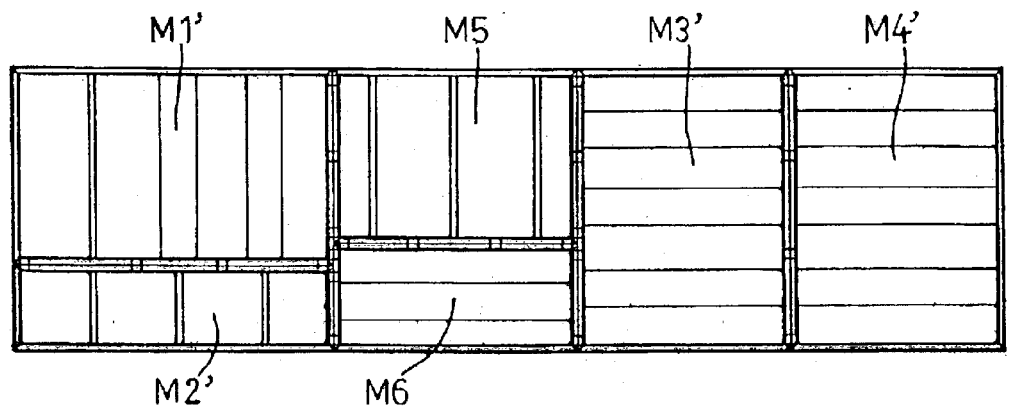
FIGS. 6 and 7 respectively represent a modular diagram and an installation diagram corresponding to a more fully equipped plant.

According to FIG. 6 the fully equipped plant has the following modular distribution: module M1' comprising the silica filter and valve battery, module M2' comprising the electrical drive and control panel, module M5 corresponding to the pump area (silica and diatomaceous earth filtration and ozone treatment), module M6 comprising the contact chamber and ozone destruction unit, and modules M3' and M4' corresponding to buffer tanks.

Figure 7:
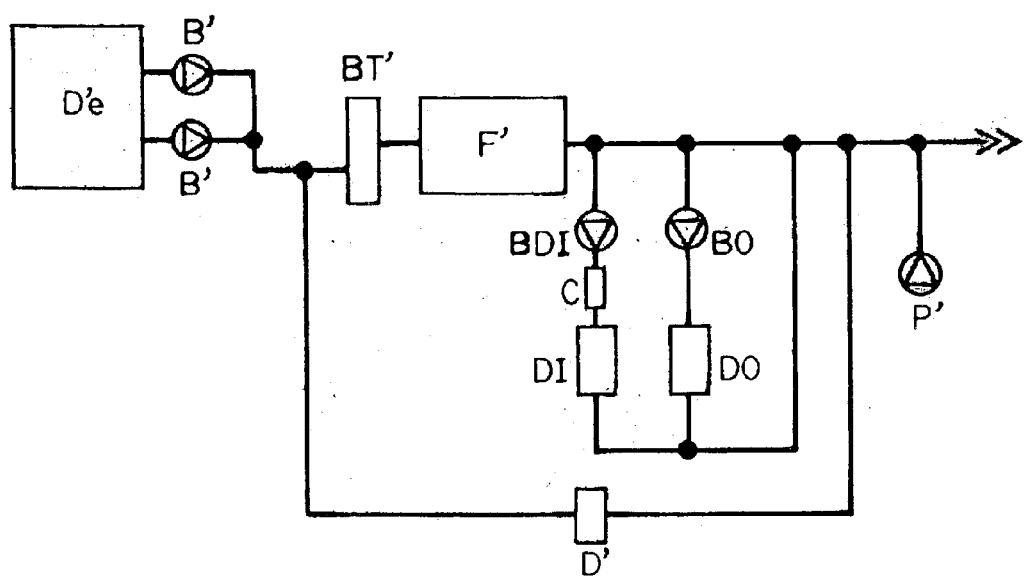

According to FIG. 7 this fully equipped plant comprises the following installation: buffer tanks D'e, recirculating pumps B', motorized valve battery BT', silica filter F', diatomaceous earth filter pump BDI, filter with charger/cleaner and diatomaceous earth store DI, ozone pump BO, ozone generator system with reflux system and intelligent destructor DO, Cl/Br proportioner D', pH proportioner P', and heater C.

The buffer tanks will preferably be independent, although they could also form a monobloc assembly.

All plants will have a drain outlet and will be apt to be connected to a computer. They will be as well possibly provided with wheels facilitating their transportation, the wheels preferably being retractable.

The invention can within its essentiality be put into practice in other embodiments only in detail differing from those having been set forth only by way of example, the other embodiments also falling within the scope of the protection being sought. This plant can hence be carried out with the best suited means, apparatuses, components and accessories, all this falling within the scope of the appended claims.

What is claimed is:

1. A swimming pool water treatment plant comprising:
   a buffer vessel (1) being provided to receive the water from the swimming pool,
   a water filtering device with a motor pump (2),
   a device for chemically treating water,
   pipes with the corresponding valves (17) and with openings for receiving the water from the swimming pool and for returning (10) the cleaned and treated water to said swimming pool, and corresponding accessories,
   all of said watering filtering device, device for chemically treating water, said pipes, and said corresponding accessories are connected and installed on a base framework (21) allowing the transport of said plant in a ready-to-operate state to the site having been chosen for said plant.

2. A swimming pool water treatment plant according to claim 1, wherein the water filtering device comprises a silica filter (5) from which the water passes to a diatomaceous earth filter (6).

3. A swimming pool water treatment plant according to claim 2, wherein the diatomaceous earth filter (6) is connected to a diatomaceous earth charger-store (7).

4. A swimming pool water treatment plant according to claim 1, wherein the water chemical treatment comprises the application of ozone and of a disinfectant such as a halogen.

5. A swimming pool water treatment plant according to claim 1, wherein it comprises a drive and control panel (8).

6. A swimming pool water treatment plant according to claim 1, wherein it comprises an acid proportioner (12).

7. A swimming pool water treatment plant according to claim 1, wherein the assembly being made up of all its components and accessories is of such dimensions as to be apt to be put in a conventional container facilitating its transportation.

8. A swimming pool water treatment plant according to claim 1, wherein all of the components making up the plant are distributed in independent modules (M) being apt to be fitted to each other.

9. A swimming pool water treatment plant according to claim 8, wherein the components of each module (M) comprise connections being particularized in correspondence with those of the components of the module (M) to which they must be fitted.

10. A swimming pool water treatment plant according to claim 8, wherein the assembly being made up of the modules (M) having been fitted together is of such dimensions as to be apt to be put in a conventional container.

* * * * *